United States Patent
Wang et al.

(10) Patent No.: US 9,546,296 B2
(45) Date of Patent: Jan. 17, 2017

(54) COATING COMPOSITIONS, COATINGS AND METHODS FOR SOUND AND VIBRATION DAMPING AND WATER RESISTANCE

(71) Applicant: PPG Industries Ohio, Inc., Cleveland, OH (US)

(72) Inventors: Wei Wang, Allison Park, PA (US); Tien-Chieh Chao, Mars, PA (US); David R. Fenn, Allison Park, PA (US); Kenneth T. Phelps, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/569,873

(22) Filed: Dec. 15, 2014

(65) Prior Publication Data

US 2016/0168411 A1   Jun. 16, 2016

(51) Int. Cl.

| | | |
|---|---|---|
| C09D 133/00 | (2006.01) |
| C09D 133/08 | (2006.01) |
| B60R 13/08 | (2006.01) |
| C09D 5/00 | (2006.01) |
| C09D 7/00 | (2006.01) |
| C09D 133/06 | (2006.01) |
| C08K 3/00 | (2006.01) |
| C08F 285/00 | (2006.01) |
| C08F 220/18 | (2006.01) |
| C08F 222/10 | (2006.01) |
| C08K 5/1515 | (2006.01) |

(52) U.S. Cl.
CPC ............ *C09D 133/08* (2013.01); *B60R 13/08* (2013.01); *C09D 5/00* (2013.01); *C09D 7/001* (2013.01); *C09D 133/068* (2013.01); *C08F 285/00* (2013.01); *C08F 2220/1858* (2013.01); *C08F 2222/1073* (2013.01); *C08K 3/0033* (2013.01); *C08K 5/1515* (2013.01)

(58) Field of Classification Search
None
See application file for complete search history.

(56) References Cited

U.S. PATENT DOCUMENTS

| | | | |
|---|---|---|---|
| 4,147,688 A | 4/1979 | Makhlouf et al. | |
| 4,242,243 A * | 12/1980 | Antonelli ............... | C08F 8/14 428/334 |
| 4,386,173 A | 5/1983 | Chang | |
| 4,739,019 A | 4/1988 | Schappert et al. | |
| 6,407,195 B2 | 6/2002 | Sherman et al. | |
| 6,433,097 B1 | 8/2002 | Nixon et al. | |
| 6,531,541 B1 | 3/2003 | Desai et al. | |
| 6,664,359 B1 | 12/2003 | Kangas et al. | |
| 7,176,269 B2 | 2/2007 | Hakuta et al. | |
| 7,217,746 B2 | 5/2007 | Munro et al. | |
| 7,323,529 B2 | 1/2008 | Sutton et al. | |
| 7,658,967 B2 | 2/2010 | DiMario | |
| 7,736,745 B2 | 6/2010 | Hong | |
| 7,973,106 B2 | 7/2011 | Fisk et al. | |
| 8,178,205 B2 | 5/2012 | Hong | |
| 2002/0156221 A1* | 10/2002 | Meyer ................ | C08F 246/00 526/319 |
| 2007/0249778 A1 | 10/2007 | Clemens et al. | |
| 2009/0212690 A1 | 8/2009 | Bruton et al. | |
| 2010/0003506 A1 | 1/2010 | Desai et al. | |
| 2010/0004369 A1 | 1/2010 | Desai et al. | |
| 2010/0210745 A1 | 8/2010 | McDaniel et al. | |
| 2010/0233146 A1 | 9/2010 | McDaniel | |
| 2010/0249295 A1 | 9/2010 | Hong | |
| 2010/0256296 A1 | 10/2010 | Hong | |
| 2011/0037013 A1 | 2/2011 | Ragunathan et al. | |
| 2011/0240064 A1 | 10/2011 | Wales et al. | |
| 2011/0250626 A1 | 10/2011 | Williams et al. | |
| 2012/0097194 A1 | 4/2012 | McDaniel et al. | |
| 2012/0149820 A1 | 6/2012 | Fuhry et al. | |

(Continued)

FOREIGN PATENT DOCUMENTS

| | | |
|---|---|---|
| CN | 1299844 A | 6/2001 |
| CN | 1312315 A | 9/2001 |

(Continued)

OTHER PUBLICATIONS

Hansen Solubility Parameters. CRC Press LLC 2000.

(Continued)

*Primary Examiner* — Satya Sastri
(74) *Attorney, Agent, or Firm* — Charles M. Yeomans; Alicia M. Passerin

(57) ABSTRACT

A coating composition having a measured solids content of at least 95% according to test method ASTM D2369 is disclosed. The composition includes a mixture of (a) a polymer prepared from one or more functional monomers comprising a (meth)acrylic monomer, an allyl monomer, or combinations thereof each having an ethylenically unsaturated double bond and an additional reactive functional group, and (b) a reactive diluent. At least some of the additional reactive functional group of the functional monomer remains unreacted during formation of the polymer. The reactive diluent has a boiling point of greater than 100° C. and a reactive functional group that reacts with the reactive functional group on the polymer at a temperature that is lower than the boiling point of the reactive diluent. Also disclosed are substrates having a cured coating thereon, the coating formed from the cured coating composition, and methods for providing sound and vibration damping.

16 Claims, No Drawings

(56) References Cited

U.S. PATENT DOCUMENTS

| | | |
|---|---|---|
| 2012/0279640 A1 | 11/2012 | Hong |
| 2012/0282475 A1 | 11/2012 | Fuhry et al. |
| 2013/0085230 A1* | 4/2013 | Hood .................. C08F 8/00 525/117 |
| 2013/0225020 A1 | 8/2013 | Flood et al. |
| 2014/0128508 A1 | 5/2014 | Wang et al. |
| 2015/0097136 A1 | 4/2015 | Wulff et al. |

FOREIGN PATENT DOCUMENTS

| | | | |
|---|---|---|---|
| CN | 1392890 | A | 1/2003 |
| CN | 102216401 | A | 10/2011 |
| CN | 102405265 | A | 4/2012 |
| CN | 102471453 | A | 5/2012 |
| EP | 0552376 | A1 | 2/1993 |
| EP | 0822950 | B1 | 10/2001 |
| EP | 0830428 | B1 | 9/2002 |
| EP | 1253176 | A2 | 10/2002 |
| EP | 1798266 | A2 | 6/2007 |
| JP | 08188626 | A | 7/1996 |
| JP | 10338836 | A | 12/1998 |
| JP | 2000053723 | A | 2/2000 |
| JP | 2007126642 | A | 5/2007 |
| JP | 5182876 | B2 | 4/2013 |
| JP | 2013132794 | A | 7/2013 |
| KR | 1019990008022 | A | 1/1999 |
| KR | 20070118029 | A | 12/2007 |
| KR | 20100025526 | A | 3/2010 |
| KR | 20100025527 | A | 3/2010 |
| WO | 0190260 | A2 | 11/2001 |
| WO | 2006055038 | A1 | 5/2006 |
| WO | 2008002842 | A1 | 1/2008 |
| WO | 2009079004 | A1 | 6/2009 |
| WO | 2009155115 | A2 | 12/2009 |

OTHER PUBLICATIONS

ACRYSOL™RM-8 Nonionic, Non-pH Dependent Rheology Modifier for Textile Formulations. Product Information Nov. 2000.

Momentive EPON™ and EPI-REZ™ Epoxy Resins. Product Information Aug. 22, 2013.

ExxonMobil ISOPAR™E Isoparaffin Fluid. Product Information Jun. 25, 2015.

ExxonMobil ISOPAR™K (EU) Isoparaffin Fluid. Product Information Jun. 25, 2015.

* cited by examiner

COATING COMPOSITIONS, COATINGS AND METHODS FOR SOUND AND VIBRATION DAMPING AND WATER RESISTANCE

FIELD OF THE INVENTION

This application generally relates to coating compositions and coatings. More specifically, this application relates to coating compositions and corresponding coatings obtained therefrom that exhibit sound and vibration damping.

BACKGROUND OF THE INVENTION

Coatings that contain a volatile component, such as water and/or an organic solvent, undergo a decrease in volume as the volatile component evaporates from the surface of the coating. As the volatile component leaves the coating, contraction forces act to pull the coating inward in all directions. Without intending to be bound by any particular theory, it is believed that if the coating has sufficient cohesive strength, the coating will contract in only one dimension in a manner such that the coating thickness will decrease while the coating resists contraction in any direction parallel to the substrate surface. In contrast, if a coating lacks cohesive strength sufficient to resist contraction parallel to the substrate surface, contraction forces will cause the coating to break up into small flat segments that are separated by gaps or continuous linear voids. This surface defect is commonly referred to as "mudcracking."

Precut asphalt- or rubber-based patches can be used for lining floor pans, deck lids and doors of automobiles to dampen or reduce road and engine noise and vibrations, preventing them from permeating into the passenger compartment of the motor vehicle. Sprayable coatings which are capable of being applied by robotics are desirable to provide for labor and cost savings, and flexibility in design specifications for imparting desired sound and vibration damping properties.

Exposure of coatings to water can cause damage to the coating and water absorption may increase coating weight, soften the coating, and/or reduce damping.

SUMMARY OF THE INVENTION

According to the present invention, a coating composition comprises: a mixture comprising: (a) a polymer prepared from one or more functional monomers comprising a (meth)acrylic monomer, an allyl monomer, or combinations thereof each having an ethylenically unsaturated double bond and an additional reactive functional group, wherein at least some of the additional reactive functional group of the functional monomer remain unreacted during formation of the polymer; and (b) a reactive diluent having a boiling point of greater than 100° C. and containing a reactive functional group that reacts with the reactive functional group on the polymer at a temperature that is lower than the boiling point of the reactive diluent; and a filler material, wherein the coating composition has a measured solids content of at least 95% according to test method ASTM D2369.

According to the present invention, a coating composition as described above when applied to a substrate and cured has a dry film thickness of at least 1 mm.

According to the present invention, a method for providing sound and vibration damping through a substrate comprises: applying to the substrate the coating composition; and at least partially curing the coating composition.

DETAILED DESCRIPTION OF THE INVENTION

As used herein, unless indicated otherwise, a plural term can encompass its singular counterpart and vice versa, unless indicated otherwise. For example, although reference is made herein to "a" (meth)acrylic monomer, "an" allyl monomer, "a" reactive diluent, "a" polymer, "a" monomer, and "a" filler material, a combination (i.e., a plurality) of these components can be used.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

As used herein, unless otherwise expressly specified, all numbers such as those expressing values, amounts, percentages, ranges, subranges and fractions may be read as if prefaced by the word "about," even if the term does not expressly appear.

As used herein, the terms "on," "onto," "applied on," "applied onto," "formed on," "deposited on," "deposited onto," mean formed, overlaid, deposited, or provided on but not necessarily in contact with the surface. For example, a coating layer "formed over" a substrate does not preclude the presence of one or more other intervening coating layers of the same or different composition located between the formed coating layer and the substrate.

As used herein, the term "reactive diluent" means an organic compound that is capable of undergoing a chemical reaction (e.g., formation of a covalent bond) with a polymer such as the polymer described herein, another species of reactive diluent, and/or its own species of reactive diluent at a temperature that is lower than the boiling point of the reactive diluent. As used herein with respect to reactive diluent, "another species" means an organic compound that has a chemical structure that is different from the reactive diluent but that is capable of undergoing a chemical reaction with the reactive diluent and/or the polymer. As used herein with respect to reactive diluent, the term "its own species" means another organic compound that has a chemical structure identical to the reactive diluent.

As used herein, reference to any monomer(s) refers generally to a monomer that can be polymerized with another polymerizable component such as another monomer, a polymer, or a reactive diluent. Unless otherwise indicated, it should be appreciated that once the monomer components react with another component to form a compound, the compound will comprise the residues of such components.

As used herein, the term "polymer" is meant to refer to prepolymers, oligomers, homopolymers, copolymers, and blends or mixtures thereof.

As used herein, "(meth)acrylate" includes both acrylate and methacrylate monomers.

As used herein, "(meth)acrylic" includes acrylics, methacrylics, and derivatives of any of these.

As used herein, the term "functional monomer(s)" refers to the monomer(s) used to prepare the polymer, having an ethylenically unsaturated double bond and an additional reactive functional group. As used herein, "additional reactive functional group," when used with respect to the functional monomer(s) or the polymer prepared therefrom means a reactive functional group other than the ethylenically unsaturated double bond of the functional monomer used to prepare the polymer. To clarify, an additional reactive functional group may be a second ethylenically unsaturated double bond.

As used herein, the term "acid functional groups" includes any acidic functional group, including carboxylic acid functional groups, for example, as well as salts thereof.

As used herein, unless indicated otherwise, the term "substantially free" means that a particular material is not purposefully added to a composition, and is only present as an impurity in a trace amount of less than 1 wt. %, based on a total weight of the composition. As used herein, unless indicated otherwise, the term "completely free" means that a composition does not comprise a particular material, i.e., the composition comprises 0 wt. % of such material.

As used herein, the term "solvent" includes water, an organic solvent, and combinations thereof, wherein the organic solvent does not have a reactive functional group capable of reacting with the reactive functional group of the polymer or the reactive functional group of the reactive diluent under typical curing conditions at which the coating composition is at least partially cured, as described in greater detail below.

As stated above, the present disclosure is directed to a coating composition comprising: a mixture comprising: (a) a polymer prepared from one or more functional monomers comprising a (meth)acrylic monomer, an allyl monomer, or combinations thereof each having an ethylenically unsaturated double bond and an additional reactive functional group, wherein at least some of the additional reactive functional group of the functional monomer remains unreacted during formation of the polymer; and (b) a reactive diluent having a boiling point of greater than 100° C. and containing a reactive functional group that reacts with the reactive functional group on the polymer at a temperature that is lower than the boiling point of the reactive diluent; and a filler material, wherein the coating composition has a measured solids content of at least 95% according to test method ASTM D2369.

According to the present invention, in addition to the ethylenically unsaturated functional group, the functional monomers have at least one additional reactive functional group. As discussed above, the additional reactive functional group remains unreacted during formation of the polymer. As such, the polymer formed from the functional monomers comprises the additional reactive functional group of the functional monomers. It will be understood, therefore, that polymerization of the functional monomers occurs primarily through the unsaturation, although it is possible that some of the additional reactive functional groups react during polymerization as well. The polymer may be a homopolymer prepared from a functional monomer containing a reactive functional group. Alternatively, the polymer of the present invention may be a copolymer prepared from different functional monomers containing a reactive functional group. If two or more different functional monomers are used, the reactive functional group on each can be the same or different.

According to the present invention, the reactive functional group of the functional monomer may comprise, for example, an epoxy group, a hydroxyl group, an anhydride group, an amino group, an acid functional group such as a carboxylic acid group or a sulfonic acid group, or combinations thereof.

According to the present invention, the polymer may be an epoxy-containing (meth)acrylate or allyl copolymer prepared from an ethylenically unsaturated composition comprising: (i) one or more ethylenically unsaturated monomers having at least one epoxy group, and (ii) one or more ethylenically unsaturated monomers which are free of epoxy groups, with the proviso that at least one of the ethylenically unsaturated monomers of (i) and/or (ii) represent a (meth)acrylic or allyl monomer containing a reactive functional group.

Non-limiting examples of ethylenically unsaturated monomers having at least one epoxy group are those containing 1,2-epoxy groups and include glycidyl (meth)acrylate, allyl glycidyl ether, or combinations thereof.

Non-limiting examples of ethylenically unsaturated monomers which do not contain epoxy groups are alkyl esters of (meth)acrylic acid containing from 1 to 20 atoms in the alkyl group. Suitable alkyl esters of (meth)acrylic acid include, for example, methyl (meth)acrylate, ethyl (meth)acrylate, butyl (meth)acrylate, and 2-ethylhexyl (meth)acrylate. Suitable other copolymerizable ethylenically unsaturated monomers which do not contain epoxy groups include, for example, vinyl aromatic compounds such as styrene and vinyl toluene; nitriles such as acrylonitrile and methacrylonitrile; vinyl and vinylidene halides such as vinyl chloride and vinylidene fluoride; and vinyl esters such as vinyl acetate.

According to the present invention, the epoxy group-containing ethylenically unsaturated monomer may be used in an amount of at least 5 percent by weight, based on the total weight of the ethylenically unsaturated composition used to prepare the epoxy-containing acrylic polymer, such as at least 20 percent by weight, such as at least 40 percent by weight, such as at least 50 percent by weight. According to the present invention, the epoxy group-containing ethylenically unsaturated monomer may be used in an amount of no more than 95 percent by weight, based on the total weight of the ethylenically unsaturated composition used to prepare the epoxy-containing (meth)acrylate polymer, such as no more than 80 percent by weight, such as no more than 40 percent by weight, such as no more than 50 percent by weight.

According to the present invention, the epoxy group-containing ethylenically unsaturated monomer may be used in an amount of from 5 to 50 percent by weight, such as 20 to 40 percent by weight, based on the total weight of the ethylenically unsaturated composition used to prepare the epoxy-containing (meth)acrylic polymer. In the present invention, from 40 to 95 percent by weight, such as 50 to 80 percent by weight, of the total weight of the ethylenically unsaturated composition may be made up of one or more alkyl esters of (meth)acrylic acid.

According to the present invention, the functional monomer may have a boiling point of at least 100° C., such as at least 115° C., such as at least 150° C., such as at least 250° C.

In preparing the epoxy-containing (meth)acrylate copolymer, the (i) one or more ethylenically unsaturated monomers having at least one epoxy group, and the (ii) one or more ethylenically unsaturated monomers which are free of epoxy groups, with the proviso that at least one of the ethylenically unsaturated monomers of (i) and/or (ii) represent a (meth)acrylate monomer containing a reactive functional group, can be mixed and reacted by conventional free radical initiated organic solution polymerization in the presence of suitable catalysts, such as organic peroxides or azo compounds, for example, benzoyl peroxide or N,N'-azobis-(isobutyronitrile).

The polymerization can be carried out in an organic solution in which the monomers are soluble. Suitable solvents are aromatic solvents such as xylene and toluene and ketones such as methyl amyl ketone. In addition, continuous polymerization techniques, such as are described in more detail below with respect to the acid functional acrylic polymer, can be used. "Soluble monomers" are understood in the context of this application to mean a homogenous mixture of monomers that do not undergo phase separation.

The polymer of the present invention may be substantially free, or in some cases, completely free, of acid functional groups, such as, for example, (meth)acrylic acid, maleic acid, fumaric acid, a partial ester of maleic acid, a partial ester of fumaric acid, a partial ester of itaconic acid, and combinations thereof.

The polymer of the present invention may be an epoxy functional acrylic made by using a continuous process at high temperature (i.e., greater than 200° C., such as 210 to 250° C., or 230 to 240° C.) and high pressure (i.e., greater than 300 psig, such as 400 to 600 psig) using a relatively low amount of initiator (i.e., less than 10 wt % based on total monomer weight). For example, the temperature can be in a range of 150 to 280° C., such as 160 to 230° C., or 170 to 210° C. The polymerization may be carried out in the substantial absence of Lewis acids and/or transition metals.

Any suitable free radical polymerization initiator may be used to produce the epoxy functional acrylic polymer, such as thermal free radical initiators. Suitable thermal free radical initiators include, but are not limited to, peroxide compounds, azo compounds and persulfate compounds. The amount of initiator used may be 0.01 to 0.5 moles initiator per mole of ethylenically unsaturated composition.

Continuous methods of polymerization are also described in U.S. Pat. No. 7,323,529 at col. 4, line 56 to col. 12, line 65, the cited portion of which being incorporated herein by reference. The epoxy functional acrylic polymer may be made by a continuous polymerization method employing at least two stirred tank reactors, such as is described in U.S. Pat. No. 7,323,529 at col. 9, lines 22-33. Moreover, the contents of the first reactor may be maintained at a significantly higher temperature than the contents of the second reactor (such as where the contents of the first reactor are maintained at a temperature of greater than 200° C., such as 210 to 250° C., or 230 to 240° C. and the contents of the second reactor are maintained at a temperature no more than 200° C., such as 150 to 200° C., or 160 to 180° C.). According to the present invention, greater than 50 percent by weight, such as at least 70 percent by weight or, in some cases, at least 80 percent by weight, of the total initiator to be used for the reaction is used in the first reactor. In addition, the residence time of the contents of the first reactor may be no more than 20 minutes, such as 1 to 20 minutes or 1 to 10 minutes. According to the present invention, the residence time of the contents of the second reactor may be more than 20 minutes, such as more than 20 minutes to 1 hour, or 30 minutes to 1 hour. "Residence time" is defined in U.S. Pat. No. 7,323,529 at col. 8, lines 54-57.

The polymerization of the present invention may be conducted under conditions such that the reaction product contains an amount of residual free monomer of less than 1 percent by weight, such as less than 0.5, or in some cases, less than 0.25 percent by weight, based on the total weight of the monomers used to make the polymer.

According to the present invention, the polymer may comprise at least 1% by weight of the functional monomer comprising the ethylenically unsaturated double bond and an additional reactive functional group, based on a total monomer weight, such as at least 5% by weight, or at least 30% by weight. According to the present invention, the polymer may comprise 100% by weight of the functional monomer, based on a total monomer weight, or may comprise no more than 90% by weight of the functional monomer, based on a total monomer weight, such as no more than 70% by weight, or no more than 50% by weight.

According to the present invention, a glass transition temperature ($T_g$) (° C.) of the polymer may be, for example, from −55° C. to 150° C., for example from 0° C. to 60° C., as determined using a Differential Scanning calorimeter (DSC), such as a Perkin Elmer Series 7 Differential Scanning calorimeter, at a scanning rate of 20° C. per minute.

According to the present invention, the weight average molecular weight ($M_w$) of the polymer can be at least 1,000 g/mol as determined by gel permeation chromatography using a polystyrene standard in tetrahydrofuran (THF), such as at least 3,000 g/mole, such as at least 5,000 g/mole, such as at least 9,000 g/mole, such as at least 150,000 g/mole.

According to the present invention, the weight average molecular weight ($M_w$) of the polymer may be no more than 1,000,000 g/mol as determined by gel permeation chromatography using a polystyrene standard in tetrahydrofuran (THF), such as no more than 100,000 g/mole, such as no more than 30,000 g/mol, such as no more than 9,000 g/mol, such as no more than 5,000 g/mol, such as no more than 3,000 g/mol.

The weight average molecular weight ($M_w$) of the polymer of the present invention can range from 1,000 grams per mole to 1,000,000 grams per mole as determined by gel permeation chromatography using a polystyrene standard in tetrahydrofuran (THF). The polymer of the present invention may have a weight average molecular weight ($M_w$) of from 1,000 g/mole to 100,000 g/mole, including for example, from 1,000 g/mole to 3,000 g/mole, from 3,000 g/mole to 5,000 g/mole, from 5,000 g/mole to 9,000 g/mole, and from 9,000 g/mole to 30,000 g/mole. The polymer may have a weight average molecular weight ($M_w$) of at least 150,000 g/mole.

According to the present invention, the polymer may further comprise a monomer that is not a (meth)acrylic monomer or an allyl monomer having an ethylenically unsaturated double bond and an additional reactive functional group, including, for example, styrene, a (meth)acrylate monomer which may be different from the functional monomer discussed above, an acrylonitrile monomer, an acrylamide monomer, a terpene monomer, and combinations thereof. Terpene, as used herein, includes α-pinene, β-pinene, terpinolene, limonene (dipentene), β-terpinene, γ-terpinene, α-thujene, sabinene, δ-3-carene, camphene, β-cadinene, β-caryophyllene, cedrene, α-bisalbone, γ-bisalbone, γ-bisalbone, zingiberene, humulene, (α-caryophyl-1-ene), α-citronellol, linalool, geraniol, nerol, ipsenol, α-terpineol, D-terpineol-(4), dihydrocarveol, nerolidol, farnesol, α-eudesmol, β-eudesmol, citral, D-citronellal, carvone, D-pulegone, piperitone, carvenone, bisabolene, β-selinene, α-santalene, vitamin A, abietic acid and mixtures of these compounds.

As mentioned above, the mixture also is comprised of a reactive diluent having a boiling point of greater than 100° C., such as greater than 150° C., such as greater than 200° C., for example. The reactive diluent of the present invention may have a boiling point of less than 350° C., such as less than 300° C., such as less than 250° C., for example. The reactive diluent of the present invention may contain a reactive functional group that reacts with the additional reactive functional group remaining within the polymer described above, another species of reactive diluent, and/or its own species of reactive diluent at a temperature that is lower than the boiling point of the reactive diluent.

According to the present invention, the reactive diluent may be mono-functional, bi-functional, or multi-functional. According to the present invention, the reactive functional group of the reactive diluent may be, for example, an epoxy functional group, an unsaturated ethylene double bond functional group, a terpene functional group, or combinations thereof.

The reactive diluent of the present invention may comprise a glycidyl ester, such as, for example, a glycidyl ester of a branched $C_9$-$C_{11}$ carboxylic acid, isomers thereof, and combinations thereof. The glycidyl ester may be the glycidyl ester of, for example, 2,2,3,5-tetramethylhexanoic acid, 2,4-dimethyl-2-isopropylpentanoic acid, 2,5-dimethyl-2-ethylhexanoic acid, 2,2-dimethlyoctanoic acid, 2,2-diethylhexanoic acid, and combinations thereof. The reactive diluent may comprise a glycidyl ester of neodecanoic acid.

According to the present invention, the reactive diluent may have an epoxy equivalent weight of at least 50 g/mol according to ASTM 1652, such as at least 200 g/mol. According to the present invention, the reactive diluent may have an epoxy equivalent weight of no more than 500 g/mol according to ASTM 1652, such as no more than 300 g/mol, such as no more than 200 g/mol.

According to the present invention, the reactive diluent may have an epoxy equivalent weight of from 50 g/mole to 500 g/mole according to ASTM D1652, including for example, from 50 g/mole to 200 g/mole, and from 200 g/mole to 300 g/mole.

The reactive diluent can lower the viscosity of the mixture. The reactive diluent of the present invention may have a viscosity of from 1 mPa·s to 4,000 mPa·s at 25° C. according to ASTM D789, such as for example, from 1 mPa·s to 3,000 mPa·s, 1 mPa·s to 2,000 mPa·s, 1 mPa·s to 1,000 mPa·s, 1 mPa·s to 100 mPa·s, or 2 mPa·s to 30 mPa·s.

The reactive diluent of the present invention may be a monomer or a polymer.

As previously discussed, the coating composition comprises a mixture comprising the polymer and the reactive diluent described above. The polymer and the reactive diluent of the present invention may be present in a single phase to form the mixture. Alternatively, the mixture may be a dispersion, such as a non-aqueous dispersion in which the polymer is dispersed in the reactive diluent. The polymer may be present in the dispersion as polymeric particles, such as polymeric microparticles described in greater detail below.

As used herein, the term "non-aqueous" with respect to a non-aqueous dispersion means that the reactive diluent is substantially free, or in some cases, completely free, of water. As used herein, the term "dispersion" with respect to a non-aqueous dispersion means a two-phase transparent, translucent, or opaque system in which the polymer is in the dispersed phase and the reactive diluent is in the continuous phase. As used herein, the term "stable non-aqueous dispersion" is understood to mean that the polymeric particles which are at least partially, substantially, and/or completely insoluble in the non-aqueous medium (e.g., organic solvent and/or reactive diluent) are capable of being distributed as finely divided, discrete and distinct particles in the non-aqueous medium and essentially do not settle, coagulate, and/or flocculate during manufacturing or on standing.

As used herein, the term "substantially free" when used in reference to the non-aqueous dispersion means that water is not purposefully added to the non-aqueous dispersion, and is only present as an impurity in a trace amount of less than 5 wt. %, based on a total weight of the non-aqueous dispersion. As used herein, unless indicated otherwise, the term "completely free" means that the non-aqueous dispersion does not comprise a particular material, i.e., the non-aqueous dispersion comprises 0 wt. % of such material (e.g., water).

The polymer of the present invention may be in the form of a dispersion of particles, a non-aqueous dispersion, or microgel as described in US Publication No. 20120149820, pars. [0004] to [0023], US Publication No. 20140128508, pars. [0006] to [0027], and US Publication No. 20120282475, pars. [0006] to [0021], each of which are incorporated herein by reference. The polymer, which is the combined composition of the core and shell, and the reactive diluent may be present as a mixture.

According to the present invention, the polymer and the reactive diluent may be present in the mixture in a combined amount of at least 20% by weight, based on a total weight of the mixture comprising the polymer and the reactive diluent, such as at least 30%, such as at least 40%, such as at least 50%. According to the present invention, the polymer and the reactive diluent may be present in the mixture in a combined amount of no more than 100% by weight, based on a total weight of the mixture comprising the polymer and the reactive diluent, such as no more than 80% by weight, such as no more than 70% by weight, such as no more than 40% by weight.

According to the present invention, the polymer and the reactive diluent may be present in the mixture in a combined amount of 20-100% by weight, based on a total weight of the mixture comprising the polymer and reactive diluent, such as, for example, 30-80% by weight, 40-70% by weight, or 50-60% by weight.

According to the present invention, the polymer may be present in the mixture in an amount of at least 30% by weight, based on a total weight of the mixture comprising the polymer and the reactive diluent, such as at least 40% by weight, such as at least 50% by weight, such as at least 70% by weight. According to the present invention, the polymer may be present in the mixture in an amount of no more than 95% by weight, based on a total weight of the mixture comprising the polymer and the reactive diluent, such as no more than 80% by weight, such as no more than 60% by weight.

According to the present invention, polymer may be present in the mixture in an amount of 30-95% by weight, based on a total weight of the mixture of polymer and reactive diluent, such as, for example, 40-80% by weight, such as 50-60% by weight, such as 70-80% by weight.

According to the present invention, the reactive diluent may be present in the mixture in an amount of at least 5% by weight, based on a total weight of the mixture comprising the polymer and the reactive diluent, such as at least 10% by weight, such as at least 30% by weight. According to the present invention, the reactive diluent may be present in the mixture in an amount of no more than 70% by weight, based on a total weight of the mixture comprising the polymer and the reactive diluent, such as no more than 50% by weight, such as no more than 40% by weight, such as no more than 20% by weight.

According to the present invention, the reactive diluent may be present in the mixture in an amount of 5-70% by weight, based on a total weight of the mixture of polymer and reactive diluent, such as, for example, 10-50% by weight, such as 30-40% by weight, such as 10-20% by weight.

According to the present invention, the mixture comprising the polymer and the reactive diluent, in the absence of filler or any other component, may have a Brookfield viscosity of from 1,000 centipoise to 25,000 centipoise measured at 100 rpm with a #6 spindle at ambient/room temperature (25° C.), including for example a Brookfield viscosity of from 1,000 centipoise to 20,000 centipoise, from 2,000 centipoise to 8,000 centipoise, from 3,000 centipoise to 6,000 centipoise, from 4,000 centipoise to 5,000 centipoise.

According to the present invention, the mixture comprising the polymer and the reactive diluent may further comprise a second polymer prepared from a monomer comprising an epoxy functional acrylate material. The second polymer may be dispersible in the reactive diluent as part of the non-aqueous dispersion.

According to the present invention, the mixture and/or coating composition can further comprise one or more polymeric film-forming materials chemically different from the polymeric particles discussed above. Non-limiting examples of useful polymeric film-forming materials include polyepoxides, polyurethanes, polyamides, polyesters, polyacrylates, polyvinyl chlorides, and mixtures and copolymers thereof.

In addition to the previously described polymer prepared from a monomer comprising an epoxy functional acrylate material, the mixture and/or coating composition of the present invention may further comprise a polyepoxide having at least two epoxide or oxirane groups per molecule and include an epoxy-functional oligomer, polymer and/or copolymer. Generally, the epoxide equivalent weight of such an epoxy-functional polymer can range from 70 to 4,000, as measured by titration with perchloric acid and quaternary ammonium bromide using methyl violet as an indicator. Suitable epoxy-functional polymers can be saturated or unsaturated, cyclic or acyclic, aliphatic, alicyclic, aromatic or heterocyclic. The epoxy-functional polymers can have pendant or terminal hydroxyl groups, if desired. The epoxy-functional polymers can contain one or more functional groups and/or substituents, non-limiting examples of which include a halogen atom, a hydroxyl group, and an ether group. A useful class of these materials include polyepoxides comprising epoxy polyethers obtained by reacting an epihalohydrin (such as epichlorohydrin or epibromohydrin) with a di- or poly-hydric alcohol in the presence of an alkali, such as diglycidyl ethers of bisphenol A, for example EPON® 828 epoxy resin which is commercially available from Momentive.

Non-limiting examples of useful thermoplastic polymeric film-forming materials include polyvinyl acetate; aromatic vinyl polymers; vinyl copolymers having vinyl aromatic hydrocarbons as monomer components such as polystyrene, styrene-butadiene copolymers, styrene-divinylbenzene copolymers and styrene-acrylonitrile copolymers; saturated polyesters including saturated aliphatic polyesters such as polyneopentyl adipate, polypropylene adipate and poly epsilon-caprolactone; polyacrylates such as polyalkyl (meth)acrylates having alkyl groups with 1-8 carbon atoms, polymethacrylates or polyalkyl(meth)acrylates obtained by polymerization of methyl methacrylate, isobutyl methacrylate and 2-ethylhexyl acrylate; saturated polyester urethanes; polybutadienes; polyvinyl chlorides and polyvinyl chloride/acetates. Useful substantially saturated polyesters can be prepared from polyfunctional acids and polyhydric alcohols by various methods, including those disclosed in U.S. Pat. No. 4,739,019 at column 3, line 22 through column 5, line 15.

If present, the film-forming material may be incorporated into the mixture comprising the polymer and the reactive diluent and/or coating composition in an amount of from 1% to 40% by weight based on the total resin solids of the mixture and/or coating composition, as the case may be, including for example, from 5% to 30% by weight.

As mentioned above, the coating composition of the present invention also comprises a filler material. The filler material may be chosen from organic filler materials, inorganic filler materials, or combinations thereof. The filler material may be capable of improving the sound and vibration damping properties of a coating obtained from at least partially, substantially, and/or completely curing the coating composition.

Organic filler materials may include various forms (e.g., powders, particles, grains, pellets, flakes, fibers, expandable spheres, blowing agents, etc.) of natural and/or synthetic materials. Non-limiting examples of such organic filler materials include various forms of plant materials (e.g., cellulose, lignan, starch, rayon, etc.), animal materials (e.g., chitin, chitosan, etc.), and/or synthetic materials (e.g., wax, polypropylene, high molecular weight polyethylene, etc.).

Non-limiting examples of inorganic filler materials include mica, powdered slate, montmorillonite flakes, glass flakes, metal flakes, talc, metal oxides, calcium oxide, iron oxide, clay minerals, mineral fibers, glass fibers, glass beads, glass bubbles or hollow spheres, ferrite, calcium silicate, calcium carbonate, barite, silica, aluminum hydroxide, alumina, and mixtures thereof.

The filler material of the present invention may be present in the coating composition in an amount of at least 20% by weight, based on a total weight of the coating composition, such as at least 30% by weight, such as at least 40% by weight. The filler material of the present invention may be present in the coating composition in an amount of no more than 80% by weight, based on a total weight of the coating composition, such as no more than 70% by weight, such as no more than 60% by weight.

According to the present invention, the filler material may be present in the coating composition in an amount of 20 to 80% by weight, based on a total weight of the coating composition, such as, for example, 30 to 70% by weight, or 40 to 60% by weight.

The coating composition of the present invention may have a measured solids content of at least 95%, based on a total weight of the composition, including for example, at least 96%, at least 97%, at least 98%, at least 99%, at least 99.5%, at least 99.6%, or at least 99.7%, based on the total weight of the composition, measured according to test method ASTM D2369.

The composition of the present invention may be substantially free of solvent. Alternatively, the composition may be completely free of solvent. As used herein, the term "substantially free," when used in reference to the absence of solvent in the composition, means that any solvent is present in the composition in a trace amount of less than 5% based on total weight of the composition. The term "completely free," when used in reference to the absence of solvent in the composition, means that there is not any solvent in the composition at all.

The coating composition of the present invention may further comprise one or more optional ingredients, additives, and/or auxiliary agents that may be selected based on the particular application of the coating composition. Non-limiting examples of such optional ingredients, additives, and/or auxiliary agents include waxes, plasticizers, surfactants (e.g., migrating surfactants), detergents, thixotropes, catalysts, initiators, accelerators, polymeric fibers, polymeric beads, polymeric bubbles or hollow spheres, ground natural or synthetic rubber, dyes, pigments, organic filler materials, carbon black, graphite, graphene, reinforcements, cellulose fibers, carbon fibers, calcium carbonate, calcium magnesium carbonate, stabilizers, corrosion inhibitors, blowing agents, antioxidants, and non-reactive diluents. The coating composition may further comprise a polymeric chain extender. Alternatively, the coating composition may be substantially free, or some cases, completely free, of polymeric chain extenders.

Suitable thixotropes include fumed silica, bentonite, stearic acid-coated calcium carbonate, fatty acid derivatives, and associative urethane thickeners, such as ACRYSOL RM-8 which is commercially available from Rohm and Haas. Thixotropes may generally be present in an amount of up to 20% by weight, based on the total weight of the coating composition.

Non-limiting examples of such catalysts include dicyandiamide, sulfur, and combinations thereof. The catalyst of the present invention may be capable of catalyzing a reaction between the polymer and the reactive diluent, a reaction between the reactive functional group of the polymer and the reactive functional group of the reactive diluent at a temperature that is lower than the boiling point of the reactive diluent, or combinations thereof.

The coating composition of the present invention may further comprise a plasticizer. The plasticizer may be dispersible in the reactive diluent with the polymer. Non-limiting examples of suitable plasticizers include adipates, benzoates, glutarates, isophthalates, phosphates, polyesters, sebacates, sulfonamides, terephthalates, and combinations thereof.

The one or more optional ingredients, additives, and/or auxiliary agents may generally be present in the coating composition in an amount of 0.1-50% by weight, based on a total weight of the coating composition, such as for, example, 0.5 to 40, such as 1 to 30, such as 1 to 10.

Once the polymerization is complete, the resultant product of the present invention may be a stable non-aqueous dispersion of polymeric particles that are insoluble in the non-aqueous medium (e.g., organic solvent and/or reactive diluent). Accordingly, the non-aqueous medium is substantially free of soluble polymer. As used herein, "substantially free" means that the non-aqueous medium contains no more than 30% by weight of dissolved polymer, including for example, no more than 25% by weight, no more than 20% by weight, no more than 15% by weight, no more than 10% by weight, or no more than 5% by weight, of dissolved polymer.

If not already present, the reactive diluent can be added to the stable non-aqueous dispersion of polymeric particles that are at least partially, substantially, and/or completely insoluble in the non-aqueous medium (e.g., solvent) before, during, and/or after the non-aqueous medium is removed (e.g., stripped under vacuum) and replaced with the reactive diluent to produce a stable non-aqueous dispersion comprising polymeric particles that are distributed as finely divided, discrete and distinct particles in the reactive diluent and essentially do not settle, coagulate, and/or flocculate during manufacturing or on standing.

The viscosity of the coating composition is application-specific based, for example, on the type of equipment used, the required/desired film thickness, and/or the required/desired sag resistance. For example, the Brookfield viscosity of the coating composition may be greater than 10,000 centipoise measured at 4 rpm to 100 rpm with a #7 spindle at ambient temperature (25° C.), including for example, from 10,000 centipoise to 1,000,000 centipoise, from 50,000 centipoise to 800,000 centipoise, from 100,000 centipoise to 700,000 centipoise, or from 200,000 centipoise to 500,000 centipoise.

According to the present invention, in some cases, the coating composition may comprise: a mixture consisting of: (a) a polymer prepared from one or more functional monomers comprising a (meth)acrylic monomer, an allyl monomer, or combinations thereof each having an ethylenically unsaturated double bond and an additional reactive functional group, wherein at least some of the additional reactive functional group of the functional monomer remains unreacted during formation of the polymer; and (b) a reactive diluent having a boiling point of greater than 100° C. and containing a reactive functional group that reacts with the reactive functional group on the polymer at a temperature that is lower than the boiling point of the reactive diluent; and a filler material; wherein the coating composition has a measured solids content of at least 95% according to test method ASTM D2369.

According to the present invention, in some cases, the coating composition may comprise: a mixture consisting essentially of: (a) a polymer prepared from one or more functional monomers comprising a (meth)acrylic monomer, an allyl monomer, or combinations thereof each having an ethylenically unsaturated double bond and an additional reactive functional group, wherein at least some of the additional reactive functional group of the functional monomer remains unreacted during formation of the polymer; and (b) a reactive diluent having a boiling point of greater than 100° C. and containing a reactive functional group that reacts with the reactive functional group on the polymer at a temperature that is lower than the boiling point of the reactive diluent; and a filler material; wherein the coating composition has a measured solids content of at least 95% according to test method ASTM D2369.

The present invention also may be a method for providing sound and vibration damping through a substrate comprising: applying to the substrate a coating composition comprising: a mixture comprising, or in some cases consisting of, or in some cases consisting essentially of: (a) a polymer prepared from one or more functional monomers comprising a (meth)acrylic monomer, an allyl monomer, or combinations thereof each having an ethylenically unsaturated double bond and an additional reactive functional group, wherein at least some of the additional reactive functional group of the functional monomer remains unreacted during formation of the polymer; and (b) a reactive diluent having a boiling point of greater than 100° C. and containing a reactive functional group that reacts with the reactive functional group on the polymer at a temperature that is lower than the boiling point of the reactive diluent; and a filler material; wherein the coating composition has a measured solids content of at least 95% according to test method ASTM D2369.

The present invention also may be a substrate having a cured coating, the cured coating having a dry film thickness of at least 1 mm. The cured coating may be formed from a coating composition comprising: a mixture comprising, or in some cases consisting of, or in some cases consisting essentially of: (a) a polymer prepared from one or more functional monomers comprising a (meth)acrylic monomer, an allyl monomer, or combinations thereof each having an ethylenically unsaturated double bond and an additional reactive functional group, wherein at least some of the additional reactive functional group of the functional monomer remains unreacted during formation of the polymer; and (b) a reactive diluent having a boiling point of greater than 100° C. and containing a reactive functional group that reacts with the reactive functional group on the polymer at a temperature that is lower than the boiling point of the reactive diluent; and a filler material; wherein the coating composition has a measured solids content of at least 95% according to test method ASTM D2369.

The coating composition described above may be applied alone or as part of a coating system that can be deposited in a number of different ways onto a number of different substrates. The coating system may comprise a number of the same or different coating layers. A coating layer is typically formed when a coating composition that is deposited onto the substrate is at least partially cured by methods known to those of ordinary skill in the art (e.g., by exposure to thermal heating). It is noted that the coating composition described above can be used in one or more of the coating layers described in the following paragraphs.

The coating composition can be applied to the surface of a substrate in any number of different ways, non-limiting examples of which include spray coating, immersion or dip coating, extrusion coating, flow coating, brush coating, roller coating, and/or knife/blade coating.

Useful substrates include those formed from metal substrates, polymer substrates (e.g., formed from thermoset materials and/or thermoplastic materials), and combinations thereof. Suitable metal substrates that can be coated include ferrous metals such as iron, steel, and alloys thereof, non-ferrous metals such as aluminum, zinc, magnesium and alloys thereof, and combinations thereof. The substrate may be formed from cold rolled steel, electrogalvanized steel such as hot dip electrogalvanized steel or electrogalvanized iron-zinc steel, aluminum or magnesium. The metal substrate to be treated can be bare, pretreated or prepainted (e.g., by electrocoating) prior to application of the coating composition.

Non-limiting examples of useful thermoset materials include polyester, epoxide, phenolic, phenol-formaldehyde, urea-formaldehyde, melamine, polyimide, polycyanurate, polyurethane, and/or vulcanized rubber (e.g., reaction injected molding urethane) thermoset materials, and combinations thereof.

Non-limiting examples of useful thermoplastic materials include polyester, acrylic polymer, polyolefin (e.g., polyethylene and polypropylene), polyamide (e.g., nylon), polybenzimidazole, vinyl polymer (e.g., polyvinyl chloride), polystyrene, fluoropolymer (e.g., polytetrafluoroethylene), polycarbonate, acrylonitrile-butadiene-styrene (ABS) copolymer, EPDM rubber, and/or polyurethane thermoplastic materials, and combinations thereof.

According to the present invention, the coating composition may be applied onto a substrate at a wet film thickness of from 1 mm to 7 mm depending on the desired sound and vibration damping requirements or properties of the cured coating. A thicker film will generally result in a higher sound and vibration damping property.

After application to the substrate, the coating composition can be subjected to a step of baking and/or curing, such as from 110° C. to 220° C., from 140° C. to 210° C., from 150° C. to 200° C., from 175° C. to 190° C., and for any desired time period (e.g., from 5 minutes to 1 hour) sufficient to at least partially dry and/or cure the coating composition on the substrate. Optionally, according to the invention, the baking and/or curing may be carried out at a temperature below the boiling point of the reactive diluent.

One or more additional baking and/or curing steps could be implemented to accommodate specific paint system configurations.

The dry film thickness of the coating layer can increase from 0% to 100% from the applied wet film thickness depending on various factors including, but not limited to, the rate of drying and the heat applied to the coating composition.

After the coating composition is applied to a substrate, alone or in combination with one or more additional coating layers, and at least partially cured, the coating may demonstrate a composite damping loss factor (CDLF) of from 0.05 to 0.25 measured at a temperature of from 10° C. to 30° C. and at a frequency of from 198 HZ to 202 HZ according to Oberst ASTM E756-05.

After the coating composition is applied to a substrate, and/or another coating layer, and at least partially cured, the coating may demonstrate a water absorption of less than 15%, for example, less than 10%, less than 5%, less than 4%, less than 3%, less than 2%, or less than 1%, according to a test method which measures a change (e.g., an increase) in the weight of the coating based on a percentage of water absorption calculated by dividing the difference between the weight of the coating before exposure to water and the weight of the coating after exposure to water by the weight of the coating before exposure to water and then multiplying by 100, as described in greater detail in the Examples hereinbelow.

ASPECTS OF THE INVENTION

1. A coating composition comprising:
a mixture comprising:
(a) a polymer prepared from one or more functional monomers comprising a (meth)acrylic monomer, an allyl monomer, or combinations thereof each having an ethylenically unsaturated double bond and an additional reactive functional group and an additional reactive functional group, wherein at least some of the additional reactive functional group of the functional monomer remains unreacted during formation of the polymer; and
(b) a reactive diluent having a boiling point of greater than 100° C. and containing a reactive functional group that reacts with the reactive functional group on the polymer at a temperature that is lower than the boiling point of the reactive diluent; and
a filler material,
wherein the coating composition has a measured solids content of at least 95% according to test method ASTM D2369.

2. The coating composition according to aspect 1, wherein the functional monomer(s) is (are) selected from (meth)acrylate monomers, allyl monomers and combinations thereof.

3. The coating composition according to aspect 2, wherein the functional monomer(s) is (are) selected from (meth) acrylate monomers, ally glycidyl ether and combinations thereof.

4. The coating composition according to aspect 2, wherein the functional monomer(s) is (are) selected from (meth) acrylate monomers.

5. The coating composition according to any one of aspects 1 to 4, wherein the reactive functional group(s) of the functional monomer(s) comprise(s) an epoxy group, a hydroxyl group, an anhydride group, an amino group, an acid functional group such as a carboxylic acid group or a sulfonic acid group, or combinations thereof.

6. The coating composition according to aspect 5, wherein the reactive functional group of the functional monomer(s) comprises an epoxy group.

7. The coating composition according to aspect 6, wherein the functional monomer comprises glycidyl (meth)acrylate.

8. The coating composition according to any one of aspects 1 to 7, wherein the polymer (a) is a copolymer.

9. The coating composition according to claim 8, wherein the polymer is a copolymer prepared from at least one functional monomer and at least monomer comprising ethylenic unsaturation but not an additional reactive functional group.

10. The coating composition according to aspects 8 or 9, wherein the polymer (a) is a copolymer prepared from one or more functional monomers and one or more ethylenically unsaturated monomers which are free of epoxy groups, preferably free of hydroxyl groups, anhydride groups, amino groups, and acid functional groups such as carboxylic acid groups or sulfonic acid groups.

11. The coating composition according to any one of aspects 8 to 10, wherein the polymer (a) comprises from 1 to 90 weight percent such as from 5 to 70 weight percent or from 30 to 50 weight percent or from 20 to 40 weight percent of from the functional monomer(s), based on a total weight of the polymer.

12. The coating composition according to aspect 10 or 11 referring back to claim 10, wherein the ethylenically unsaturated monomer(s) free of epoxy groups is (are) chosen from a vinyl aromatic monomer such as styrene and vinyl toluene; a (meth)acrylate such as an alkyl ester of (meth)acrylic acid, preferably containing 1 to 20 atoms in the alkyl group; an (meth)acrylonitrile; an acrylamide; a vinyl halide such as vinyl chloride; a vinylidene halide such as vinylidene fluoride; a vinyl ester such as vinyl acetate; a terpene; and combinations thereof.

13. The coating composition according to aspect 12, wherein the ethylenically unsaturated monomer(s) free of epoxy groups is (are) chosen from a vinyl aromatic monomer such as styrene and vinyl toluene; an alkyl ester of (meth)acrylic acid, preferably containing 1 to 20 atoms in the alkyl group, and combinations thereof.

14. The coating composition according to aspect 13, wherein the polymer (a) comprises from 40 to 95 weight percent such as from 50 to 80 weight percent of the one or more alkyl esters of (meth)acrylic acid, based on a total weight of the polymer (a).

15. The coating composition according to any one of aspects 1 to 14, wherein the polymer (a) has a weight average molecular weight of from 1,000 g/mole to 100,000 g/mole such as from 1,000 g/mole to 3,000 g/mole or from 3,000 g/mole to 5,000 g/mole or from 5,000 g/mole to 9,000 g/mole or from 9,000 g/mole to 30,000 g/mole, as determined by gel permeation chromatography using a polystyrene standard in tetrahydrofuran (THF).

16. The coating composition according to any one of aspects 1 to 14, wherein the polymer (a) has a weight average molecular weight of at least 150,000 g/mole as determined by gel permeation chromatography using a polystyrene standard in tetrahydrofuran (THF).

17. The coating composition according to any one of aspects 1 to 16, wherein the polymer (a) is substantially free of acid functional groups.

18. The coating composition according to any one of aspects 1 to 17, wherein the reactive diluent (b) is selected from a polymeric compound, a non-polymeric compound, and combinations thereof.

19. The coating composition according to any one of aspects 1 to 18, wherein the reactive functional group of the reactive diluent (b) comprises an epoxy group.

20. The coating composition according to aspect 19, wherein the reactive diluent (b) has an epoxy equivalent weight of from 50 g/mole to 500 g/mole such as from 50 g/mole to 200 g/mole or from 200 g/mole to 300 g/mole, according to ASTM D1652.

21. The coating composition according to any one of aspects 1 to 20, wherein the reactive diluent (b) is a mono-functional reactive diluent.

22. The coating composition according to any one of aspects 1 to 21, wherein the reactive diluent (b) is a glycidyl ester such as a glycidyl ester of a branched $C_9$-$C_{11}$ carboxylic acid, preferably a glycidyl ester of neodecanoic acid.

23. The coating composition according to any one of aspects 1 to 22, wherein the reactive diluent (a) is present in an amount of from 5 to 70 weight percent such as from 10 to 60 weight percent or from 20 to 50 weight percent or from 40 to 50 weight percent or from 30 to 40 weight percent or from 20 to 30 weight percent or from 10 to 20 weight percent, based on a total weight of the mixture of the polymer (a) and reactive diluent (b).

24. The coating composition according to any one of aspects 1 to 23, wherein the polymer (a) is present in an amount of from 30 to 95 weight percent such as from 40 to 90 weight percent or from 50 to 80 weight percent or from 50 to 60 weight percent or from 60 to 70 weight percent or from 70 to 80 weight percent or from 80 to 90 weight percent, based on a total weight of the mixture of polymer (a) and reactive diluent (b).

25. The coating composition according to any one of aspects 1 to 24, wherein the polymer (a) and the reactive diluent (b) are present as a single phase.

26. The coating composition according to any one of aspects 1 to 24, wherein the polymer (a) is dispersed in the reactive diluent (b).

27. The coating composition according to any one of aspects 1 to 26, wherein the mixture further comprises a second polymer that is dispersed in the reactive diluent.

28. The coating composition according to any one of aspects 1 to 27, wherein, in the absence of the filler, the mixture of the polymer (a) and the reactive diluent (b) has a Brookfield viscosity of from 1,000 centipoise to 25,000 centipoise measured at 100 rpm with a #6 spindle at 25° C. temperature.

29. The coating composition according to any one of aspects 1 to 28, further comprising a catalyst that is capable of catalyzing a reaction between the polymer (a) and the reactive diluent (b).

30. The coating composition according to any one of aspects 1 to 29, further comprising an antioxidant, a plasticizer, or combinations thereof.

31. The coating composition according to any one of aspects 1 to 30, wherein the composition is free of solvent or comprises solvent in an amount of less than 5 weight percent, based on the total weight of the composition.

32. The coating composition according to any one of aspects 1 to 31, wherein the filler material is an organic filler material, an inorganic filler material, or combinations thereof.

33. The coating composition according to any one of aspects 1 to 32, wherein the filler material is present in the coating composition in an amount of from 20 to 80 weight percent such as from 30 to 70 weight percent or from 40 to 60 weight percent, based on a total weight of the coating composition.

34. The coating composition according to any one of aspects 1 to 33, wherein the polymer (a) and reactive diluent (b) are present in the mixture in a combined amount of from 20 to 100 weight percent such from 30 to 75 weight percent or from 40 to 70 weight percent or from 50 to 60 weight percent, based on a total weight of the mixture comprising the polymer (a) and reactive diluent (b).

35. A coating applied to a substrate comprising a reaction product prepared from the coating composition according to any one of aspects 1 to 34, which, after cure, has a dry film thickness of at least 1 mm.

36. The coating applied to the substrate according to aspect 35, which after cure demonstrates a composite damping loss factor of from 0.05 to 0.25 measured at a temperature of from 10° C. to 30° C. and at a frequency of from 198 Hz to 202 Hz according to Oberst ASTM E756-05.

37. The coating applied to the substrate according to aspects 35 or 36, which after cure demonstrates a water absorption of less than 15%.

38. A method for providing sound and vibration damping through a substrate comprising:
applying to the substrate a coating composition according to any one of aspects 1 to 34; and
at least partially curing the coating composition.

The following specific examples are provided merely for illustration purposes only, and are not intended to be limiting unless otherwise specified.

EXAMPLES

Preparation of examples of the coating composition are described below. Each of the materials listed below are in grams (g) or parts by weight, unless indicated otherwise.

Example 1

A polyester intermediate 1 for a seed stage stabilizer was prepared as follows:

TABLE 1

| Ingredients | Parts by Weight |
| --- | --- |
| Charge #1 | |
| 12-Hydroxystearic acid | 2304 |
| Toluene | 411 |
| Charge #2 | |
| Methane Sulfonic Acid | 4.6 |
| Charge #3 | |
| Glycidyl Methacrylate | 279 |
| t-Butyl Catechol | 2.3 |
| N,N-Dimethyl-dodecylamine | 9.2 |
| Toluene | 104 |

Charge #1 was added into a 5-liter, 4-necked flask equipped with a motor-driven steel stir blade, a thermocouple, a nitrogen inlet, and a water-cooled condenser. The reaction mixture was heated to reflux (the initial reflux temperature was approximately 130° C., and this increased to about 155° C. by the end of the process). Charge #2 was added into the reaction flask after the reaction mixture was melted. After 90% of the water (approximately 100 grams) from the reaction was collected, one sample was taken to measure the acid value using titration method. The reaction mixture was cooled to 130° C. when the acid value was between 29 and 30. The reaction mixture was then air sparged and Charge #3 was added into the reaction flask. The reaction mixture was held at 130° C. until the acid value was below 0.4. The intermediate solution thus obtained had an acid value of 0.4 mg KOH per gram of resin (measured by titration); a weight average molecular weight (Mw) of 5,973 g/mole and a number average molecular weight (Mn) of 3,595 g/mole (measured by gel permeation chromatography using polystyrene standards); and a free monomer glycidyl methacrylate content of 2.63 weight % (measured by gas chromatography).

Example 2

Stabilizer 1 was prepared as follows:

TABLE 2

| Ingredients | Parts by Weight |
| --- | --- |
| Charge #1 | |
| Butyl Acetate | 545 |
| Charge #2 | |
| Polyester Intermediate 1 from Example 1 | 775 |
| Methyl Methacrylate | 588 |
| Glycidyl Methacrylate | 56 |
| Xylene | 474 |
| Charge #3 | |
| Butyl Acetate | 418 |
| VAZO 64[1] | 25.8 |
| Charge #4 | |
| Butyl Acetate | 75 |
| Charge #5 | |
| Methacrylic Acid | 11.4 |
| t-Butyl Catechol | 0.16 |
| N,N-Dimethyldodecylamine | 1.5 |

[1]VAZO 64 is 2,2'-azobis(2-methylpropionitrile), available from DuPont.

Charge #1 was added into a 5-liter, 4-necked flask and heated to 99° C. under a nitrogen blanket. At 99° C., Charges #2 and #3 were added into the reaction flask over 3 hours. Charge #4 was used to rinse Charges #2 and #3 after they were finished. The reaction mixture was then held at 99° C. for 4 hours. Charge #5 was added when the hold was complete, and then the reaction mixture was heated to 135° C. The reaction mixture was held at 135° C. for 4 hours. The seed stage stabilizer thus obtained had an acid value of 0.14 mg KOH per gram of resin (measured by titration); a weight average molecular weight (Mw) of 18,434 g/mole and a number average molecular weight (Mn) of 2,616 g/mole (measured by gel permeation chromatography using polystyrene standards); and a free monomer content of methyl methacrylate of 1.47 weight % and glycidyl methacrylate of 0.13 weight % (measured by gas chromatography).

Example 3

Non-aqueous Dispersion 1 was prepared as follows:

TABLE 3

| Ingredients | Parts by Weight |
|---|---|
| Charge #1 | |
| Heptane | 260 |
| Toluene | 28 |
| Charge #2 | |
| Methyl methacrylate | 4.67 |
| Hydroxyethyl acrylate | 10.0 |
| Stabilizer from Example 2 | 7.30 |
| Charge #3 | |
| Vazo 67[1] | 1.23 |
| Heptane | 16.0 |
| Toluene | 11.0 |
| Charge #4 | |
| Methyl methacrylate | 40.0 |
| Glycidyl methacrylate | 124.0 |
| Hydroxyethyl acrylate | 247.0 |
| Stabilizer from Example 2 | 93.98 |
| N-octyl mercaptan | 4.11 |
| Charge #5 | |
| Vazo 67 | 1.67 |
| Heptane | 63.0 |
| Toluene | 63.0 |
| Charge #5 | |
| Vazo 67 | 0.82 |
| Toluene | 10.0 |

[1]VAZO 67 is 1,1'-Azobis(cyclohexanecarbonitrile), available from DuPont.

Charge #1 was added into a 2-liter, 4-necked flask equipped with a motor-driven steel stir blade, a thermocouple, a nitrogen inlet, and a water-cooled condenser. The reaction mixture was heated to 90° C., by a mantle controlled by the thermocouple via a temperature feedback control device. Charges #2 and #3 were added via addition funnel over 10 minutes, and then the reaction mixture was held at 90° C. for 30 minutes. After the hold, Charge #4 and #5 was added over 3 hours, and then the reaction mixture was held at 90° C. for 1 hour. After the hold, charge #6 over 10 min, and then the reaction mixture was held at 90° C. for 1 hour. The non-aqueous dispersion thus obtained had a volume averaged particle size of 218 nm (measured by Zetasizer).

Example 4

Non-aqueous Dispersion 2 was prepared as follows:

TABLE 4

| Ingredients | Parts by Weight |
|---|---|
| Charge #1 | |
| Non aqueous dispersion 1 from Example 3 | 500 |
| CARDURA E10[1] | 240 |

[1]CARDURA E10 is the glycidyl ester of VERSATIC ™ Acid 10, a synthetic saturated monocarboxylic acid of highly branched $C_{10}$ isomers, available from Momentive Specialty Chemicals, Inc.

Charge #1 was added into a 1-liter, 4-necked flask equipped with a motor-driven steel stir blade, a thermocouple, a nitrogen inlet, and a water-cooled condenser. The reaction mixture was heated to 50° C. and then the solvents in Non aqueous dispersion 1 (Example 3) were vacuumed off at 28 inch Hg pressure. The Brookfield viscosity of the resultant non-aqueous dispersion 2 was 376 centipoise measured at 50 rpm with a #2 Spindle at ambient/room temperature (25° C.).

Example 5

Non-aqueous Dispersion 3 was prepared as follows:

TABLE 5

| Ingredients | Parts by Weight |
|---|---|
| Charge #1 | |
| Non aqueous dispersion 1 from Example 3 | 400 |
| CARDURA E10 | 130 |

Charge #1 was added into a 1-liter, 4-necked flask equipped with a motor-driven steel stir blade, a thermocouple, a nitrogen inlet, and a water-cooled condenser. The reaction mixture was heated to 50° C. and then the solvents in Non aqueous dispersion 1 (Example 3) were vacuumed off at 28 inch Hg pressure. The Brookfield viscosity of the resultant non-aqueous dispersion 3 was 2,527 centipoise measured at 100 rpm with a #2 Spindle at ambient/room temperature (25° C.).

Example 6

Continuous Acrylic Copolymer 1 was prepared as follows:

TABLE 6

| Ingredients | Parts by Weight |
|---|---|
| Charge #1 | |
| Ethylhexyl Acrylate | 1404 |
| Glycidyl methacrylate | 1080 |
| Styrene | 720 |
| Methyl methacrylate | 396 |
| Di-tert-amyl peroxide | 108 |
| Charge #2 | |
| Di-tert-amyl peroxide | 36 |

The continuous reactor setup included one 300 mL reactor and a 4 L flash tank unit. The 300 mL reactor was initially filled with butyl cellosolve and was heated to 210° C. At 210° C., charge #1 began to be pumped with a 5 minute residence time in the reactor, and the reactor pressure was kept at 400-600 psi. The flash tank was heated to 170° C., and Charge #2 was fed at 1.12 mL/minute into the flash tank. The resultant copolymer had a weight average molecular weight (Mw) 3,494 g/mol (measured by gel permeation chromatography using polystyrene standards); and a free monomer content of ethylhexyl acrylate of 0.32 weight %, styrene of 0.04 weight % and methyl methacrylate of 0.22 weight % (measured by gas chromatography), and glycidyl methacrylate of 0.40 weight % (measured by high performance liquid chromatography).

Example 7

Resin A was prepared as follows:
70 parts of continuous acrylic copolymer 1 from Example 6 and 30 parts of CARDURA E10 were charged into a beaker and were placed in a 110° C. oven for 2 hr, and then were mixed well under mechanical agitation.

The Brookfield viscosity of Resin A was 1,610 centipoise measured at 100 rpm with a #6 Spindle at a temperature of 27° C.

Example 8

Resin B was prepared as follows:

60 parts by weight of non-aqueous dispersion 3 from Example 5, 100 parts by weight of continuous acrylic copolymer 1 from Example 6, and 26 parts by weight of CARDURA E10 were charged into a beaker and were placed in a 110° C. oven for 2 hr, and then were mixed well under mechanical agitation.

The Brookfield viscosity of Resin B was 2,400 centipoise measured at 100 rpm with a #6 Spindle at ambient/room temperature (25° C.).

Coating Compositions

Preparation

The listed ingredients in Table 7 below were mixed at low agitation in a container using an air-driven motor. The ingredients were added to a container in the order shown in Table 7 and the mixing speed was increased to maintain a vortex throughout the addition.

TABLE 7

| Component | Ex. 9 | Ex. 10 | Ex. 11 |
|---|---|---|---|
| Resin A[1] | 36 | — | — |
| Non-Aqueous Dispersion 3[2] | — | 36 | — |
| Resin B[3] | — | — | 36 |
| Urethane diol[4] | 3 | 3 | 3 |
| Raven 410[5] | 0.1 | 0.1 | 0.1 |
| Calcium Oxide[6] | 1 | 1 | 1 |
| Dyhard 100SF[7] | 1.55 | 1.55 | 1.55 |
| Diuron[8] | 0.14 | 0.14 | 0.14 |
| Ajicure MY-25[9] | 0.23 | 0.23 | 0.23 |
| Ajicure PN-40[10] | 0.68 | 0.68 | 0.68 |
| Dolocron 4512[11] | 115 | 115 | 115 |

[1]Resin A from Example 7
[2]Non-aqueous dispersion 3 from Example 5
[3]Resin B from Example 8
[4]Reaction product of propylene carbonate and JEFFAMINE 400, prepared as in Example A of U.S. Pat. No. 7,288,595
[5]Carbon black powder available from Columbian Chemicals
[6]Calcium oxide available from Mississippi Lime Company
[7]Cyanoguanidine available from Alz Chem
[8]Dimethyl-1,1,3-(3,4-dichlorophenyl) available from Alz Chem
[9]Epoxy accelerator available from Ajinomoto Fine Techno Company
[10]Epoxy accelerator available from Ajinomoto Fine Techno Company
[11]Calcium magnesium carbonate available from Specialty Minerals Coatings Composite Damping Loss Factor The vibration damping of each coating was measured using the Oberst ASTM Test Method E756-05 ("Standard Test Method for Measuring Vibration-Damping Properties of Materials"), Sections 3 and 10. The principal measure of sound damping in this test is loss factor, the ratio of loss modulus to storage modulus of the material. Oberst values typically range from 0.001 for uncoated steel (thickness 1 millimeter) (if the steel panel is struck, one would hear a "clang") to 0.01 ("bong") to 0.1 ("bunk") to 0.5 ("thud") for increasingly efficient coatings.

The Oberst test was used to measure the sound loss factor of the coating-substrate composite. Each test sample was applied to an Oberst Bar, which is a metal bar formed from special oil-hardening ground flat stock, AISI/SAE GRD 0-1, 1 mm thick, 10 mm wide and 240 mm long from McMaster-Carr, and cured as described above. The weight of each cured coating over 210 mm coat length was 6.72+−.0.05 grams. The Oberst loss factor values were normalized to 6.72 grams (3.2 kg/m$^2$) for comparison. Composite damping loss factors were measured over a temperature range of −10 to 40° C. and at a frequency of 200 Hz.

TABLE 8

| | Composite Damping Loss Factor at 200 Hz | | |
|---|---|---|---|
| Temperature | Ex. 9 | Ex. 10 | Ex. 11 |
| −10° C. | — | 0.095 | 0.070 |
| 0° C. | 0.087 | 0.103 | 0.114 |
| 10° C. | 0.109 | 0.086 | 0.139 |
| 20° C. | 0.110 | 0.083 | 0.150 |
| 30° C. | 0.108 | 0.066 | 0.111 |
| 40° C. | 0.075 | 0.050 | 0.072 |

Water Resistance

Draw down of the above coating was made on a 4 inch×4.5 inch electrocoated steel panel. The panel was weighed and recorded and a template of 3 inches wide and 3 mm thick was used to draw down the above coating to 4 inches in length in the center of the panel. The coated panel was baked in an oven with the following schedule: 23 minutes at 155° C. followed by 18 minutes at 150° C. and then 30 minutes at 140° C. The panel was kept at the ambient temperature for 10 minutes between each bake. The baked panel was stored at room temperature for 24 hours before testing.

The baked panel was weighed and recorded before test started. The difference between the panel weight without coating and panel weight with the baked coating was calculated and recorded as baked coating weight. The test panel was then placed in a 100% condensing humidity cabinet which was kept at 40° C. The panel was removed from the cabinet after 7 days. After removing the panel, the surface water was dried with paper towel and the panel was weighed immediately.

The percentage of water absorption was calculated by dividing the difference between the panel weight of the baked coating before exposure to water and the panel weight of the baked coating after exposure to water by the panel weight of the baked coating before exposure to water and then multiplying by 100.

TABLE 9

| | Ex. 9 | Ex. 10 | Ex. 11 |
|---|---|---|---|
| % Water Absorption[1] | 2.32 | 4.87 | 3.45 |

[1]7 days in a 40° C., 100% condensing humidity chamber

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. A coating composition comprising:
   a mixture comprising:
   (a) a polymer prepared from one or more functional monomers comprising a (meth)acrylic monomer, an allyl monomer, or combinations thereof each having an ethylenically unsaturated double bond and an additional reactive functional group; wherein at least some of the additional reactive functional group of the functional monomer remains unreacted during formation of the polymer; and
   (b) a reactive diluent having a boiling point of greater than 100° C. and a reactive functional group that reacts with the reactive functional group on the polymer at a temperature that is lower than the boiling point of the reactive diluent; and
   a filler material,
   wherein the polymer is dispersed in the reactive diluent and the coating composition has a measured solids content of at least 95% according to test method ASTM D2369.

2. The coating composition according to claim 1, wherein the functional monomers comprise glycidyl (meth)acrylate.

3. The coating composition according to claim 1, wherein the polymer comprises from 1 to 70 weight percent of the functional monomer(s), based on a total weight of the polymer.

4. The coating composition according to claim 1, wherein the polymer is prepared from one or more of the functional monomers and one or more monomers having an ethylenically unsaturated double bond without an additional reactive functional group.

5. The coating composition according to claim 1, wherein the polymer has a weight average molecular weight of from 1,000 g/mole to 100,000 g/mole, as determined by gel permeation chromatography using a polystyrene standard in tetrahydrofuran.

6. The coating composition according to claim 1, wherein the polymer has a weight average molecular weight of at least 150,000 g/mole, as determined by gel permeation chromatography using a polystyrene standard in tetrahydrofuran.

7. The coating composition according to claim 1, wherein the polymer is substantially free of acid functional groups.

8. The coating composition according to claim 1, wherein the reactive functional group of the reactive diluent comprises an epoxy functional group.

9. The coating composition according to claim 1, wherein the reactive diluent is a mono-functional reactive diluent.

10. The coating composition according to claim 1, wherein the reactive diluent is a poly-functional reactive diluent.

11. The coating composition according to claim 1, wherein the reactive diluent is present in an amount of from 5 to 70 weight percent, based on a total weight of the mixture of the polymer and reactive diluent.

12. The coating composition according to claim 1, wherein the mixture further comprises a second polymer that is dispersed in the reactive diluent.

13. The coating composition according to claim 1, wherein a mixture of the polymer and the reactive diluent, in the absence of the filler material or any other component, has a Brookfield viscosity of from 1,000 centipoise to 25,000 centipoise measured at 100 rpm with a #6 spindle at ambient temperature.

14. The coating composition according to claim 1, further comprising a catalyst that is capable of catalyzing a reaction between the polymer and the reactive diluent.

15. The coating composition according to claim 1, further comprising an antioxidant, a plasticizer, or combinations thereof.

16. The coating composition according to claim 1, wherein the composition is substantially free of solvent.

* * * * *